(12) United States Patent
Iyengar et al.

(10) Patent No.: US 7,395,279 B2
(45) Date of Patent: Jul. 1, 2008

(54) SYSTEM AND METHOD FOR ACHIEVING DIFFERENT LEVELS OF DATA CONSISTENCY

(75) Inventors: Arun Kwangil Iyengar, Yorktown Heights, NY (US); Richard P. King, Scarsdale, NY (US); Lakshmish Macheeri Ramaswamy, Atlanta, GA (US); Daniela Rosu, Ossining, NY (US); Karen Witting, Croton-on-Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 596 days.

(21) Appl. No.: 10/715,237

(22) Filed: Nov. 17, 2003

(65) Prior Publication Data

US 2005/0108298 A1    May 19, 2005

(51) Int. Cl.
*G06F 17/30* (2006.01)
*G06F 12/00* (2006.01)
(52) U.S. Cl. .................... 707/201; 707/2; 711/133
(58) Field of Classification Search .............. 707/2, 707/201; 711/133
See application file for complete search history.

(56) References Cited

U.S. PATENT DOCUMENTS

| | | | |
|---|---|---|---|
| 6,145,054 A * | 11/2000 | Mehrotra et al. | 711/119 |
| 6,202,132 B1 * | 3/2001 | Islam et al. | 711/141 |
| 6,567,893 B1 * | 5/2003 | Challenger et al. | 711/118 |
| 2002/0107935 A1 * | 8/2002 | Lowery et al. | 709/216 |
| 2003/0061272 A1 * | 3/2003 | Krishnamurthy et al. | 709/203 |
| 2003/0172236 A1 * | 9/2003 | Iyengar et al. | 711/145 |

OTHER PUBLICATIONS

Stenstrom ("A Cache Consistency Protocol for Multiprocessors with Multistage Networks", ACM, 1989, pp. 407-415).*
J.K. Ousterhout, A. R. Cherenson, F. Douglis, M. N. Nelson and B. B. Welch; The Sprite Network Operating System; IEEE; 1988, pp. 23-36; University of California at Berkeley.
J.H. Howard, M. L. Kazar, S. G. Menees, D. A. Nichols, M. Satyanarayanan, R. N. Siebotham and M. J. West; Scale and Performance in a Distributed File System; ACM Transaction on Computer Systems, vol. 6, No. 1, Feb. 1988, pp. 51-81.
J. Challenger, A. Iyengar and P. Dantzig; A Scalable System for Consistently Caching Dynamic Web Data; IEEE; 1999; 10 pages; IBM Research; T.J. Watson Research Center, Yorktown Heights, NY.

* cited by examiner

*Primary Examiner*—Joon H Hwang
(74) *Attorney, Agent, or Firm*—Keusey, Tutunjian & Bitetto, P.C.; Mark Wardas

(57) ABSTRACT

A system and method for maintaining consistency in a system where multiple copies of an object may exist is provided for maintaining consistent copies. Consistency is maintained using a plurality of consistency policies in which at least one consistency policy results in different performance than a second consistency policy. A consistency policy is selected from the plurality consistency policies for each object to improve system performance.

29 Claims, 9 Drawing Sheets

SYSTEM AND METHOD FOR ACHIEVING DIFFERENT LEVELS OF DATA CONSISTENCY

BACKGROUND OF THE INVENTION

1. Field of the Invention

The present invention relates to data storage and more particularly to systems and methods for achieving data consistency among multiple copies.

2. Description of the Related Art

Many computer applications create multiple copies of the same data. Maintaining consistency of these multiple copies is critically important. How the updating of the different copies is coordinated leads to different levels of consistency among the copies, in return for different costs to perform that coordination. Typically, a stronger consistency, with closer coordination between peer cache updates, results in a larger consumption of resources and larger worst-case completion time.

A problem of keeping multiple caches consistent with each other is evident in processor caches for multiprocessors and file caches for distributed file systems. For processor caches, response times must be extremely fast (orders of magnitude faster than those for Web caches). To achieve these high speeds, the caches have extremely short and fast links of guaranteed reliability to a memory controller that permits them to be informed simultaneously of updates. Techniques that work well given those facilities are simply not practical for distributed applications such as Web caches.

The Andrew File System (AFS) uses a weak consistency method, where the server informs clients of updates. This weak consistency scheme, with the clients checking with the server (see e.g., J. Howard, M. Kazar, S. Menees, D. Nichols, M. Satyanarayanan, R. Sidebotham, and M. West in "Scale and performance in a distributed file system", ACM Transactions on Computer Systems, 6(1):51-81, February 1988), can have significant overhead.

One problem with implementing applications in prior art consistency schemes emerges from the fact that these schemes are not sensitive to the variations in the consistency needs of an object during its lifetime. These schemes "force" the object to maintain a consistency policy throughout its lifetime. The consistency mechanisms are not flexible enough to adapt to the consistency requirements of the object based on its state.

The effect of this shortcoming is that each object is implemented always with the strongest consistency it would ever require at any point in its lifetime. Maintaining objects at strong consistency levels is costly in terms of the load on both the consistency coordinator and the caches. This heavy load results in the end user experiencing high latencies.

Further, if the load of the consistency management is bursty (as it often is), it will suddenly increase the load on the system. This would not only increase the average latency to unacceptably high values, but might also result in problems such as buffer overflows causing requests to be rejected by the system. Therefore this approach of maintaining strong consistency for all objects does not scale well with the increasing number of objects.

Therefore, a need exists for a scalable and adjustable system and method for providing different levels of consistency throughout a distributed system and for particular objects over their lifetime.

SUMMARY OF THE INVENTION

A system and method for maintaining consistency in a system where multiple copies of an object may exist is provided for maintaining consistent copies. Consistency is maintained using a plurality of consistency policies in which at least one consistency policy results in different performance than a second consistency policy. A consistency policy is selected from the plurality consistency policies for each object, wherein different consistency policies are available simultaneously to improve system performance.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
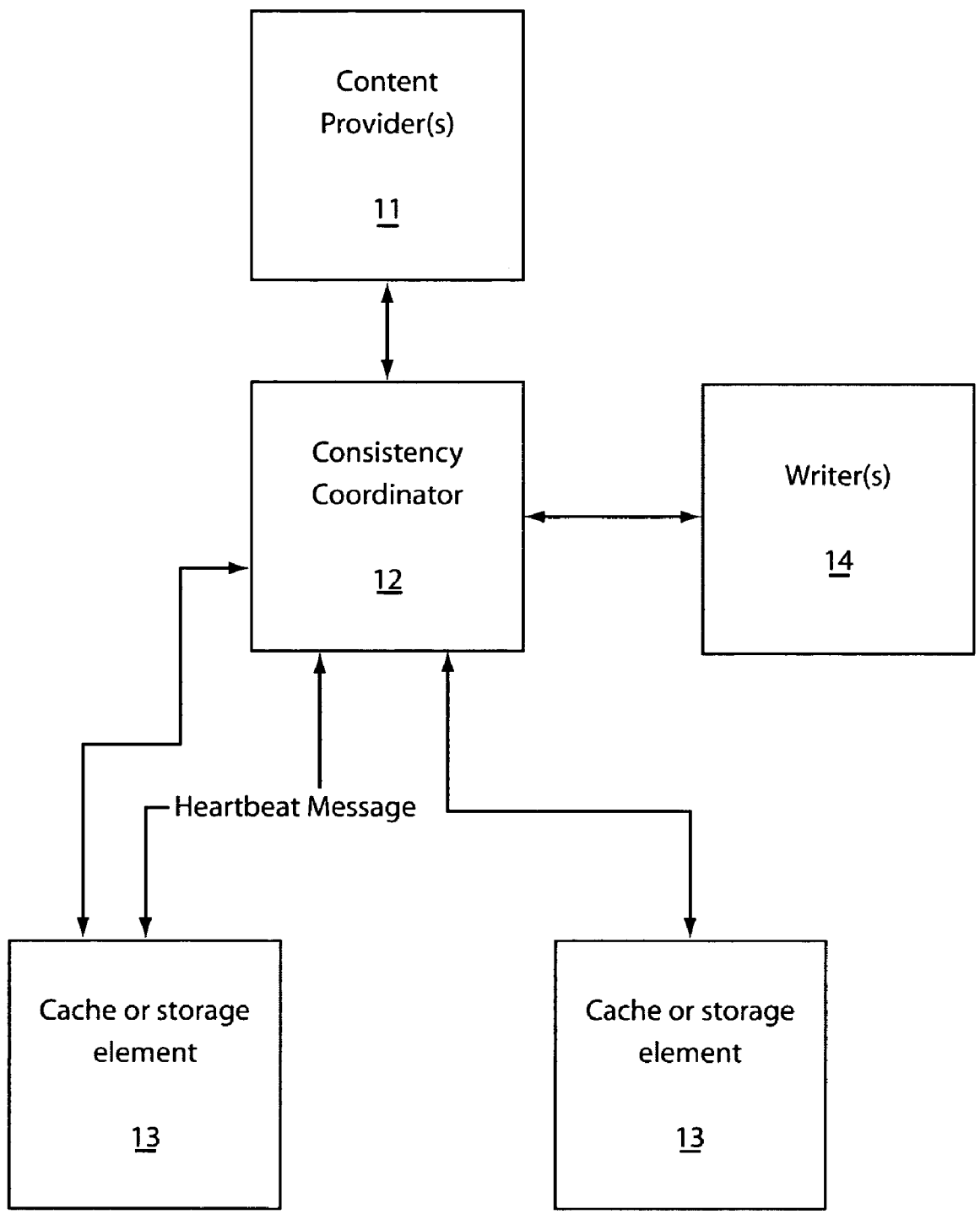
FIG. 1 is a block/flow diagram of a system showing features of the present invention.

When multiple copies of an object exist within a system, a key problem is how to ensure that, upon object updates, clients reading the various copies obtain "consistent" content. The semantics of "consistent" depends on system requirements. At one end, the system can provide strong consistency, ensuring that at anytime, a request to read an object is satisfied with the latest version of the object. At the other end, the system can provide weak consistency, ensuring that a read returns a value for the object, which was current at some point in the past.

Strong consistency needs a tight coordination of updates of copies of an object. In a system of peer caches, one has to ensure that at the time when a new version of an object becomes available, no peer cache can serve an earlier version.

Therefore, all the cached copies of an object should be invalidated before an update takes place in any of the caches.

Weak consistency does not require the coordination of updates. Individual caches can acquire and serve the latest version of an object even if peer caches have not invalidated their old versions. Therefore, one limitation of weak consistency methods is that there is no guarantee that all caches storing a copy of the object will receive messages and process them at exactly the same time. Namely, during an object update, in the time interval between the first and the last cache receive their invalidation messages, client requests for the updated object that reach different caches can receive different versions of the object. The likelihood of this inconsistency increases when there is a wider variance in communication times between the individual caches and the content provider/coordinator.

Weak consistency methods can differ in how long of a time it takes and how many system resources are consumed for updating all object copies with the latest version. In comparison to weak consistency methods, strong consistency methods are likely to need more message exchanges and may result in a longer time interval in which the object is not accessible. The difference becomes relevant when the distance between content provider and peer caches increases.

The present invention is used to implement a cache consistency scheme. While our invention is described in the context of caches, it should be clear to one of ordinary skill in the art that these techniques can be applied to application state for a broad range of applications in addition to caches. The present systems and methods integrate several cache consistency methods in a unique framework that enables the content-providing application to customize, on a per-object basis, the dissemination of cache updates to remote caches. For example, in deployments with relatively large variations of transfer times between content provider and remote caches, the application can choose to use strong consistency methods only for a small subset of the objects, and weak consistency methods for the rest of the objects.

Several applications can make use of the present data consistency methods including but not limited to storage elements, which may include storage elements which may include caches, Web applications, file systems, memory storage devices and databases. It is also to be understood that objects as referred to herein may include any form of data, data sets, data blocks, and/or objects used in object-oriented programming.

The present invention provides several different consistency methods with different degrees of coordination between the peer caches, which therefore includes different resource needs and completion times for object update operations.

It should be understood that the elements shown in FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, a system 10 having a plurality of caches 13 storing data from one or more content providers 11 is illustratively shown. In one scenario, one or more writers perform updates to cached data. It is possible for a writer 14 and a cache 13 to reside on the same node or to constitute the same entity. Similarly, it is possible for a writer 14 and a content provider 11 to reside on the same node or to constitute the same entity.

The consistency coordinator 12 coordinates interactions among content providers 11, writers 14, and caches 13. Consistency coordinator 12 may be distributed across multiple nodes and/or multiple consistency coordinators 12 may exist in the system. The use of multiple consistency coordinators can result in higher availability, as the system may be able to function in the event of a failure of less than all of the consistency coordinators. Multiple consistency coordinators can also increase the throughput of the system and thus improve performance.

Although content provider 11, writer 14, caches 13, are depicted in FIG. 1 with communication paths to consistency coordinator 12, it is possible to have other communication paths in the system within the spirit and scope of the invention. As one such example, a writer 14 may communicate with a content provider 11 directly. Communication may also be achieved by employing heartbeat messages 27 as will be explained below.

Weak Consistency

For weak consistency paths, expiration-time consistency will now be addressed. Expiration-time consistency is a method used for Web caches, which communicate with content providers via HTTP. The content provider assigns to each object an expiration time. Consistency is managed by caches obeying expiration times. Namely, if an object is requested after its expiration time, the cache contacts the content provider to obtain the latest version of the object or, if the object has not changed, the new expiration time.

Update-all consistency addresses the problem of single-writer updates. With this method, consistency is managed by sending consistency messages to all caches whenever an object changes. The type of consistency message depends on the implementation and object characteristics. Generally the message instructs the cache to invalidate any local version of the identified object it may have.

Caches send an acknowledgment that they have received and successfully processed the invalidation message. If they fail to respond within a timeout period, the message is resent. If a cache fails to respond after several retries, special action is taken.

Update-holders consistency addresses the problem of single-writer updates. This method is similar to update-all consistency except that consistency messages are only sent to caches that are storing the object. The consistency coordinator maintains information that indicates which caches are storing which objects. This information is used when an object update occurs to create the list of caches to which invalidation messages are to be sent. To enable this ability, the consistency coordinator may act as a reverse proxy between the content provider and the caches. In some cases, a consistency coordinator may not have exact information about which caches ares toring which objects. In these situations, the consistency coordinator can still use the information that it has to make intelligent choices.

When an object needs to be updated, the coordinator determines which caches include the object and sends consistency messages only to those caches. To maintain an accurate list of which caches include which objects the coordinator updates its state when the following types of operations occur:

1. when a cache miss is served. The cache sends a GET request to the consistency coordinator, which will update its state appropriately.
2. when a cache discards an object. The cache notifies the consistency coordinator that the object is no longer in the cache.

3. when an object is updated. The coordinator manages the sending of invalidation messages and updates its state appropriately.

The consistency coordinator may be a single entity or may run across multiple applications and/or nodes. If a consistency coordinator is running on multiple nodes, one method for achieving high availability and high throughputs is for each consistency coordinator node to maintain information about different sets of objects. Based on the name of the object, the consistency coordinator node corresponding to the object could be determined. There are several methods for assigning objects to consistency coordinator nodes including hashing based on the object name.

Assigning objects to consistency coordinator nodes should be done in a manner which distributes load evenly across the consistency coordinator nodes. If one node of a consistency coordinator fails, then the system only loses information about where objects are stored for the objects corresponding to the failed node, not all of the objects. It is also possible to have redundancy in how objects are assigned to consistency coordinator nodes. That way, the caches storing an object could be determined from more than one consistency coordinator. This adds additional fault tolerance since even less information may be lost in the event of a cache failure.

Update-Local-Copy consistency addresses the problem of multiple-writer updates. With this method, a writer accesses its local copy, performs the updates, and sends the new content to the consistency coordinator. The coordinator pushes the content to other caches using either update-all or update-readers consistency methods. Optionally, the coordinator sends an acknowledgement of the update to the writer.

If the updated content arrives while the coordinator is in the process of pushing another update for the same object, it will save the newly arrived content until the current update procedure is completed. If another version of the object is already waiting for update, this version is discarded and the newly received version is saved.

Update-Global-Copy consistency addresses the problem of multiple-writer updates. Different than Update-Local-Copy, in this method, the writer updates the most recent version existing in the system. Towards this end, before the update, the writer contacts the consistency coordinator to retrieve the most recent version of the object. The consistency coordinator sends the content, or acknowledges that the local copy in the write cache is the most recent. Upon sending the reply, the coordinator records a write lock for the object held by the writer and assigns it a lock timeout.

Upon receiving the most recent version of the object, the writer performs the update and sends the new version to the consistency coordinator, which cancels the write lock, and distributes the new content to the other caches using either update-all or update-readers consistency methods. Optionally, the coordinator sends an acknowledgement of update to the writer cache.

If the consistency coordinator receives another request for update before the current write lock for the object is either released or expires, it postpones the reply until the update is received or the write lock expires. In the former case, the new version is sent to the requesting node and a new write lock is set for the object. In the latter case, the writer cache is sent a negative acknowledgment of update, and the coordinator sends the available version of the object to the requesting node and a new lock is set for the object. Upon receiving a negative acknowledgement, the cache invalidates the updated version, if already created, and may reinitiate the update procedure. If an update completes before the previous version was fully distributed to caches (according to the chosen protocol), the coordinator saves the new content and acts as indicated for update-local-copy if the second update completes before the distribution completes. Read requests which arrive at the coordinator for an object with a write lock are responded to with the most recent version available on the coordinator.

The expiration-time consistency method is limited by the ability of the content provider to provide a good estimate for when an object is to expire. In many circumstances, this is not possible, and an object is updated before its expiration time. If only HTTP is used to communicate between content provider and caches, when the update occurs, the content provider has no way of initiating object invalidation or expiration-time change, thus the cache continues to serve the obsolete version.

Update-all and Update-holders consistency methods do not exhibit this limitation. By sending messages that invalidate an updated object or that simply change its expiration time to the time of the actual update, these methods can provide better consistency than expiration-time consistency. Comparing Update-holders and Update-all methods, the former method needs fewer consistency messages if many of the updated objects are not present in all caches. This benefit is more relevant when the update rate is relatively high.

However, Update-holders has the disadvantage that the consistency coordinator has to be notified of any cache update. If caches are modified frequently, the coordinator could become a bottleneck. A more scalable solution is to have the caches batch discard notifications, instead of sending them as they occur; this approach diminishes the difference in consistency messages between Update-holders and Update-all methods.

Strong Consistency Methods

Coordinate-all consistency is based on the idea that upon an update, caches invalidate their copy of the updated object before any of the caches can serve the new version of the object. More specifically, upon an object update, before making the new version available, the consistency coordinator sends invalidation messages to remote caches. A cache invalidates its copy of the object, if available, and acknowledges the invalidation request.

The consistency coordinator waits to receive acknowledgments from caches. If a cache fails to respond within a timeout period, the invalidation message is resent, up to a preset limit on the number or duration of retries. If this limit is reached, the cache is declared inaccessible and an implementation specific mechanism ensures that if active, the cache stops serving objects.

Once caches have acknowledged the notification or have been declared inaccessible, the consistency coordinator allows access to the new version of the object. Requests for the updated object that arrive at a cache after the invalidation message has been processed are handled in the way of a traditional cache miss, meaning that the cache sends a request to the coordinator for the first request and waits for a reply, queuing subsequent requests behind the first one. The coordinator reply depends on the stage of the consistency procedure.

Coordinate-holders consistency addresses the problem of single-writer updates. The method is based on the idea that an object update procedure like the one defined for Coordinate-all consistency should only involve those caches that will access the object without validation. Coordinate-holders consistency is similar to update-holders in that the consistency coordinator maintains information that indicates which caches are storing which objects. When the writer/content provider wishes to update an object it contacts the consistency coordinator. The coordinator notifies caches currently storing the object to invalidate their copy of the object. When these caches have acknowledged the request, the coordinator makes the new version of the object available.

If a cache fails to acknowledge the invalidation message the coordinator retries the request until it receives a response, up to a preset limit on the number or duration of retries. If this limit is reached, the cache is declared inaccessible and an implementation specific mechanism ensures that if active, the cache stops serving objects.

Figure 2:
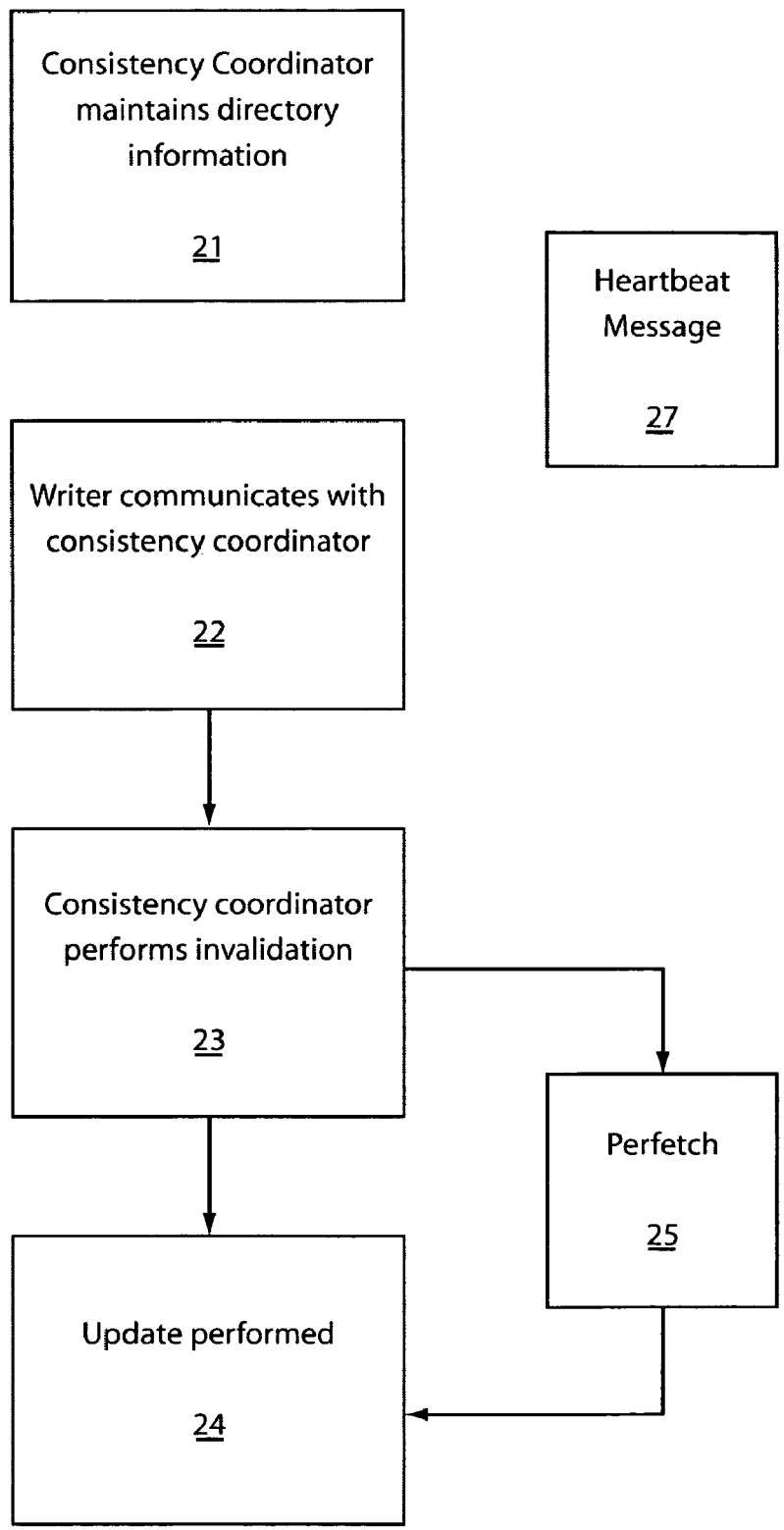
FIG. 2 is a block/flow diagram showing a method for maintaining consistency between copies in accordance with the present invention.

Referring to FIG. 2 with continued reference to FIG. 1, a method for achieving strong consistency in accordance with the present invention is depicted. Block 21 is constantly active as the system executes. The consistency coordinator 12 maintains information about which objects are being stored in which caches. In block 22, a writer 14 initiates a request to update an object. It contacts the consistency coordinator 12.

In block 23, the consistency coordinator 12 determines which caches, if any, are storing the object and for each cache including a copy of the object, the consistency coordinator 12 instructs the cache to delete its copy. After it receives acknowledgements that the deletions have completed, the consistency coordinator 12 informs the writer 14 that it can proceed with the update. If the object is frequently requested, in block 25, it may be desirable to prefetch the object into one or more caches after the update has completed. This step is optional.

There are a number of variations and options for the coordinate-holders method. A method for coordinating updates to an object when there are multiple writers is described below. This method can be used in conjunction with the coordinate-holders consistency scheme.

Also described herein is how cache failures can be handled using heartbeats.

Deferred-invalidation consistency addresses the problem of single-writer updates and provides strong consistency in the case when the clocks of all nodes in the system are perfectly synchronized. The method is based on the idea that caches are instructed to discard the old version of an object and start serving the most recent version at a time in the future when each cache is likely to have either learned about the update or declared itself disconnected. The coordinator, based on the available infrastructure mechanisms and configuration parameters, may determine the length of this time interval.

The protocol is defined by the following steps. When the content provider wishes to update an object it contacts the consistency coordinator. The coordinator decides on the time when the deferred invalidation has to be enacted by the caches and sends to all caches a deferred-invalidation message indicating the object and the time of invalidation. Upon receiving this message, a cache marks the object for invalidation at the indicated time (e.g., by setting the expiration time to the indicated time), and sends an acknowledgment to the coordinator.

Requests that are received by a cache between the receipt of the deferred-invalidation message and the invalidation time are replied with the old version of the object. The first request after the invalidation time is served the new version of the object. Caches that do not acknowledge the deferred-invalidation message by the time of the enactment are considered down by the coordinator. Caches that have not received the deferred-invalidation message are likely to have considered themselves down by the time of the invalidation time, and caches that have received the message but their acknowledgement does not reach the coordinator, are likely to be either down or enacting a correct invalidation at the invalidation time.

Multiple-writers Strong consistency addresses the problem of multiple-writer updates in the context of enforcing strong consistency among the caches storing the object. In this method, before the update, the writer contacts the consistency coordinator to retrieve the most recent version of the object. The consistency coordinator sends the content, or acknowledges that the local copy in the writer cache is the most recent. Upon sending the reply, the coordinator records a write lock for the object held by the writer and assigns it a lock timeout.

Upon receiving the most recent version of the object, the writer performs the update and sends the new version to the consistency coordinator, which cancels the write lock, and distributes the new content to the other caches using either coordinate-all or coordinate-holders consistency methods. To the writer cache, the coordinator sends an acknowledgement of update upon receiving all of the acknowledgements to the related invalidation requests. The writer is not using the new version of the object to reply to client requests until it receives an acknowledgement from the coordinator. In the meantime, it can use the previous version of the object to reply to requests that only require a read of the updated object. If the writer receives an invalidation request before the acknowledgment, it discards both the old and the updated versions of the object.

If the consistency coordinator receives another request for update before the current write lock for the object expires, it postpones the reply until the update is received or the write lock expires. In the former case, the new version is sent to the requesting node and a new write lock is set for the object. In the latter case, the writer cache is sent a negative acknowledgment of update, and the requesting node is sent the version of the object available to the coordinator and a new lock is set for the object. Upon receiving a negative acknowledgement, the cache invalidates the updated version, if already created, and it can reinitiate the update procedure.

If an update completes before the previous version was fully distributed to caches (according to the chosen protocol), the coordinator saves the new content and acts as indicated for update-local-copy if the second update completes before the distribution completes.

Read requests arrived at the coordinator for an object with a write lock are responded with the most recent version available on the coordinator.

One issue of both Coordinate-all and Coordinate-holders methods is that the caches may respond with very different rates, some relatively fast while others relatively slow. As a result, the updated object is not accessible at faster responding caches for relatively long time periods. During this period, pending requests from clients are queued; thus, the response latency may be unpredictably high. Deferred-invalidation consistency addresses this drawback by allowing the caches to serve the old version of the update object until the system can guarantee that all of the active caches are ready to serve the new version of the object. Therefore, requests arrived at active caches will never be blocked because other caches in the system fail to respond to the update procedure. The drawback is that updated content is available with a longer delay than for Coordinate methods when all caches are active and fast responding.

An issue with the Coordinate-all method is that on each update, the consistency coordinator contacts each cache in the configuration, whether or not the cache has a copy of the updated object. This can result in unnecessary network traffic if objects tend to be stored only in small subsets of the caches.

The Coordinate-holders consistency addresses this issue of the Coordinate-all consistency because only the caches that have stored the object are involved in the consistency enforcement protocol. Deferred-invalidation consistency can be applied to coordinate all caches or only the holders of the updated object.

For Multiple-writers Strong consistency, the worst-case time of write completion includes a multiple of the write lock timeout and an invalidation timeout.

Cache Consistency Infrastructure

The present invention integrates the above consistency methods.

The system of the present invention includes at least one consistency coordinator 12 associated with the content provider server(s) 11 and several consistency slaves, corresponding to remote caches 13, which store copies of objects produced by content providers and may update them as a result of client requests. The consistency slaves may be co-located with the corresponding caches and implement the cache counterpart of the consistency protocols.

The architecture of the present invention includes one or more consistency coordinators. Multiple consistency coordinators permit higher throughputs and higher availability. If one consistency coordinator fails, a back-up consistency coordinator can take over for the failed one. The functions performed by the coordinator may include at least the following:

1. Maintain information about which caches are storing which objects
2. Access and keep track of attributes of objects specified by the content provider. In particular, the coordinator should get the consistency policy to be used for an object.
3. Coordinate updates, through invalidation, to the caches upon request from content providers.

Additionally, the coordinator can function as a reverse proxy cache for the content provider, serving requests for objects invalidated through consistency protocols, and obviating the need for the content provider to handle these requests.

The coordinator handles several types of requests, which may include the following:

GET requests, which are used by caches to retrieve objects of interest.

IF-MOD-SINCE requests, which are used to check whether an object was updated since a particular moment in the past, and if so, to retrieve the new version of the object.

UPDATE requests, which are used by content providers/writers to notify that a new version of an object is available.

LOCK requests, which are used by content providers/writers to notify their intent to initiate an object update.

In the process of serving GET and IF-MOD-SINCE requests the coordinator may retrieve the requested object from the content provider, possibly saving it in a local cache, and returning it to the requesting cache. Alternatively, the coordinator may reply to the cache with a REDIRECT message, indicating the node (cache or content provider) to which the cache should send its request.

Both GET and IF-MOD-SINCE requests may be delayed when the coordinator is in the process of updating the object. The coordinator can implement a policy of choice for handling requests received while the related object is being updated. For example, the reply can be postponed until all invalidations are complete, or an error message can be sent immediately indicating the page is not available.

An UPDATE request triggers the coordinator to begin the consistency procedure. Based on the consistency policy of the object, the coordinator sends invalidation messages to caches and waits for acknowledgments from caches. For objects with multiple writers/content providers, a writer may issue a LOCK request prior to initiating the update procedure. Depending on the type of consistency of the object, the writer may update its object-related information to indicate that object is in process of being updated by the writer. Also, the coordinator may delay the reply until the UPDATE requests from writers previously locking the object have been completed.

In the event of a failure, the coordinator may lose part or all of its object and cache-related information. The coordinator can use a number of techniques for reacquiring information lost in the event of a failure. For example, the coordinator may acquire, either immediately or over time, information of which caches include which objects. One way to do this is to demand immediately that all caches either clear their caches or send to the coordinator the list of the currently cached objects with update-holders and coordinate-holders policies. Alternatively, the information can be built up over time by invalidating caches for objects, which have not been updated since the coordinator has restarted.

The coordinator may be designed so that it can use a variety of different protocols and mechanisms for communicating with caches and servers. The coordinator can also be adapted to perform functions not necessarily related to consistency management, such as collecting statistical information from the caches and monitoring availability/responsiveness of the caches. If multiple coordinators are being used, the coordinators can be configured so that different coordinators manage different subsets of the object space; possibly with the directory hash partitioned among these components. This can provide high scalability and availability.

Object Meta Information and State

An object usually has a consistency policy assigned to it. For either of the strong consistency policies, an object has two states, Serving and Updating. The Serving state indicates that the object is consistent in all caches and can be served by the coordinator. The Updating state indicates that an update request for the object is in process, and any request received for the object at the coordinator should be queued until the update is completed or replied to with an error message. This state begins when the update request is received from the content provider, and ends when all invalidation acknowledgements have been received (or retried until timeout) and the new version of the object can be made available.

For either of the weak consistency policies, an object usually has only one state, Serving, which indicates that it can be served by the coordinator.

A cache can be in one of three states:

Available, which indicates that consistency-related communication initiated by the coordinator with the cache was completed correctly;

Retry, which indicates that the cache has not responded to the most recent message sent by the coordinator; and Down, which indicates that the cache is considered failed.

The coordinator views a cache as Available, as long as the cache is responding within a timeout period to the messages sent by the coordinator. If the coordinator experiences an error communicating with a cache, it changes the state of the cache to Retry and continues to retry the failed communication. If the communication succeeds within an implementation-specific interval, the state of the cache returns to Available. On the other hand, if the communication fails, the cache is considered Down and no further communication is sent to it until the cache sends a "BackToLife" message, indicating that it would like to recover its status since contact was lost. On receipt of that request the coordinator and cache perform the consistency recovery protocol.

To bound the latency of completing a strong consistency protocol and the likelihood of inconsistency for weak consistency protocols, the coordinator sends to caches periodic heartbeat messages. Given the constant stream of requests from the caches, the heartbeats need not be in the form of separate messages; the presence of normal message traffic could take its place except during idle periods.

When a cache state is Available, heartbeat messages are sent every heartbeat interval. In Retry state, a cache is not sent heartbeats, but the coordinator is actively retrying the failing communication for as long as a heartbeat interval. If the message retry is successful, normal heartbeat messages resume and no further action is required. If the heartbeat interval passes without an acknowledgment from the cache then the coordinator changes the state of the cache to Down. When the coordinator changes the state to Down, the cache, if alive, declares itself Down as well, because it has not received any heartbeat message for the last heartbeat interval (because the server did not send any). In this state, the cache is not serving any object with coordinate-type or update-type consistency policy, but it can serve objects with expiration-based consistency.

One aspect can be derived from noticing that the need to allow completion of the barrier synchronization during updates of strongly-consistent objects is different from the need to keep caches from serving excessively stale weakly-consistent objects. These two needs may best be served by significantly different timeouts for the cache to use for passing from the Available state to the Down state with regard to strongly-consistent versus weakly-consistent objects. For example, it may be felt that service of updates for strongly-consistent objects should never be delayed by more than 15 seconds, while it may be perfectly acceptable to allow service of weakly-consistent objects to continue for up to 2 minutes after the update has taken place. Having separate timeout intervals for these 2 types of objects would allow the lapse of service during update of a strongly-consistent object to be kept to a reasonable minimum while, at the same time, avoiding lapses in service of weakly-consistent data due to unnecessarily stringent timing demands on the caches' network connections to the coordinator.

There are several types of requests or commands that are received and sent by the coordinator in accordance with the present invention. The coordinator's response depends on the status of the cache and the status of the object. The coordinator may also update its own status based on receipt of the request. As a general procedure, when the coordinator receives a command from a Down cache, other than a request to recover, the coordinator returns an error message that notifies the cache that it should be Down. This causes the cache to perform recovery before it serves more objects. This situation occurs when the coordinator believes the cache has gone down but the cache does not believe it is down.

GET Request

The coordinator receives GET requests from a cache when it is asked to serve an object, which it is not in its cache, for example, a cache miss. The coordinator retrieves the requested object from the content provider (or from a local cache if appropriate) and returns it to the cache. When the object being requested has consistency policy of update-holders or coordinate-holders, a GET request indicates that the cache issuing the request now has this object in its cache and should be included in update processing. The coordinator updates its information to make note of this status change.

If the object is in state Updating (e.g., in the process of being updated with one of the coordinate-type policies), the GET request is queued until the update is complete or replied with an error message.

IF-MODIFIED-SINCE Request

The coordinator receives IF-MODIFIED-SINCE requests when the cache includes an object, but may not contain the most recent version of the object. The coordinator processes the request as appropriate, returning a new version of the object if appropriate. When the object being requested has consistency policy of update-holders or coordinate-holders, the coordinator updates its information appropriately.

If the object is in state Updating (e.g., in the process of being updated with one of the coordinate-type policies), the request is queued until the update is complete or replied to with an error message.

DISCARD Request

The coordinator receives DISCARD requests when a cache chooses to discard an object that has update-holders or coordinate-holders policy. Upon receiving a DISCARD request, the coordinator updates its information to reflect that the cache is no longer storing the object.

UPDATE Request

The coordinator receives an UPDATE request from a content provider or writer that notifies the coordinator that a new version of an object is available. The procedure executed upon receiving this command depends on the type of consistency of the updated object.

Weak Consistency Policies: Update-all, Update-holders, Update-local-copy

Upon receiving an update for an object with a weak consistency policy, the coordinator refreshes the version of the object, updating the meta-data information, and possibly retrieving the new version of the object in the local cache. The coordinator sends invalidate messages to either all its associated caches, in the case of update-all, or all caches known or suspected to have the object, in the case of update-holders. The coordinator waits for acknowledgments from the caches for the invalidate command, and retries if necessary. If a cache fails to respond after retrying for the heartbeat interval, the coordinator declares that cache Down and stops communication with it until that cache has performed recovery.

Weak Consistency Policies: Update-Global Copy

Upon receiving an update for an object with update-global copy consistency, the coordinator checks whether the node is the current holder of the object lock. If this is true, the indication that the node is the lock holder is removed, and an update procedure described herein is performed, and, eventually, the first node waiting in the object's lock queue is granted the lock (e.g., sent a reply to its LOCK request). If the requesting node is not the lock holder, the update request is denied and the node is sent an error message.

Strong Consistency Policies: Coordinate-all, Coordinate-holders

Upon receiving an update for an object with a strong consistency policy, the coordinator updates the status of the object to Updating. This ensures that future requests for the object are queued. Then, the coordinator sends invalidate messages to either all its associated caches, in the case of coordinate-all, or all caches known or suspected to have the object, in the case of coordinate-holders. The coordinator waits for acknowledgments from caches for the invalidate command, and retries if needed. If a cache fails to respond after retrying for the heartbeat interval, the coordinator declares that cache Down and stops communication with it until that cache performs the recovery procedure. Once caches have acknowledged the invalidate command or have been declared Down, the coordinator makes the new version of the object available and updates the object state to Available.

Deferred-Invalidation Policy

Upon receiving an update for an object with a strong consistency policy, the coordinator determines the invalidation time and registers it in the object descriptor. Then, the coordinator sends deferred-invalidation messages to either all or the holder caches, depending on the configuration. The coordinator waits for acknowledgments from the caches for the invalidate command, and retries if needed. If a cache fails to respond after retrying for the heartbeat interval, the coordinator declares that cache Down and stops communication with it until that cache performs the recovery procedure. Requests that arrive at the coordinator prior to the invalidation time are served with the old version of the object. The first request received after the invalidation time triggers the actual update, by discarding the old version and retrieving the new version from the content provider or from the local repository.

Strong Consistency Policies: Multiple-writers Strong

Upon receiving an update for an object with update-global copy consistency, the coordinator checks whether the node is the current holder of the object lock. If this is true, the indication that the node is the lock holder is removed, an update procedure is performed, and, eventually, the first node waiting in the object's lock queue is granted the lock (e.g., sent a reply to its LOCK request). If the requesting node is not the lock holder, the update request is denied and the node is sent an error message.

LOCK Request

The coordinator receives a LOCK request when a content provider or writer decides to initiate an update procedure for an object with multiple writers and consistency type Update-Global Copy or Multiple-writers Strong. Upon receiving the LOCK request, the coordinator checks whether the object is being locked by another node. If this is true, the requesting node is placed on the waiting queue of the lock. If this is false, the object is marked as being locked by the requesting node and the node is sent a reply indicating the availability of the object for update and the most recent version of the object. Optionally, the reply may include the content of the most recent version of the object.

CONSISTENCY-POLICY-CHANGE Request

The coordinator receives a CONSISTENCY-POLICY-CHANGE request when a content provider notifies the coordinator when the consistency policy for the object has changed. If a consistency policy change is received while an object is being updated, the currently active update is completed using the previous policy, and the new policy takes effect once the update is complete.

Changing to Policy Expiration-time, Update-all, Coordinate-all

If the new policy is one, which does not need cache/object relationships to be maintained by the coordinator, then changing the policy of an object is relatively simple. Once active updates are complete the coordinator removes state information about the object. This applies to changing to policies: expiration-time, update-all and coordinate-all.

Changing to Policy Update-holders or Coordinate-holders

When changing to policy update-holders or coordinate-holders the list of caches including the object should be built if the prior policy was update-all or coordinate-all. In this case, the coordinator invalidates the object in caches. The function is similar to updating an object with policy update-all. Invalidations are sent to all caches and the coordinator waits for acknowledgments. Once all caches acknowledge or are declared Down, the change is complete. During the period that the coordinator is waiting for acknowledgments no updates to the object are allowed, but GET requests are honored as if the new policy was in effect.

Recover or BackToLife Request

Once a cache detects that it may have lost communication with the coordinator, normally via a missing heartbeat, it sends a Recover, or BackToLife, message to the coordinator. When the cache state at the coordinator is Available, the coordinator response indicates that communication was not lost, meaning a heartbeat may have been lost but no updates happened during that time so that cache state is still valid. In this case no further processing is needed.

When the cache state is Down, the coordinator reply signals the cache to initialize the recovery procedure because the cache lost at least one invalidation message.

When the cache state is Retry, the coordinator reply indicates that retry is taking place. Also, the coordinator may extend the retry interval to ensure that the retry will continue for at least a configuration-specific constant. This helps minimize the likelihood of declaring the cache down just after its connectivity recovered, but it is a trade-off with the latency of a strong consistency update.

Heartbeat Notification

The coordinator sends heartbeat notifications to all caches in state Available, at fixed time intervals. The heartbeat interval is a system configuration parameter. The cache does not have to acknowledge heartbeat messages, but uses them to verify that the coordinator still considers it alive. It is also possible within the spirit and scope of the present invention to send heart beat messages from a cache to the consistency coordinator. Heartbeat messages do not have to be sent to a cache when the coordinator is waiting for the cache to acknowledge a command/message.

Invalidation Notification

The coordinator sends Invalidation notifications to one or more caches in state Available to indicate that particular objects should be discarded from their local stores. These messages are triggered by UPDATE requests. Depending on the type of consistency of the invalidated objects, caches may have to acknowledge the receipt of an Invalidation notification.

Consistency Slave

The consistency slave is a module loaded on the cache node. The functions of this module may include the following:
1. track of consistency state of the various objects in the local cache; and
2. interact with consistency coordinator.

The consistency slave configuration parameters include the address of consistency coordinator(s). In systems with multiple consistency coordinators, it is assumed that the mapping of objects to consistency coordinators is defined by configuration parameters.

Data structures for the consistency slave will now be described. The consistency slave maintains state for the objects with coordinate-holders and update-holders consistency policies. The presence of an object ID on a list maintained by a consistency slave indicates that the cache has to send a discard request when the object is removed from the cache. The Consistency Slave maintains state for the objects currently locked by the cache applications. Also, the consistency slave maintains state regarding the connectivity of the local node to the rest of the system, in particular to the consistency coordinator. The per-object state of the consistency slave may be maintained separately or may be integrated with the state maintained by the cache application.

The cache application invokes the consistency slave when it needs to read or write an object, and when it discards an object from its local store.

Read Command

The Read command is invoked when the cache has to serve a read request. The call parameters provide the object identifier, and metadata information such as the existence of the object in the cache. If the object is registered with the consistency slave and the metadata indicates a consistency type that does not need consistency checks, the call returns with the indication that the cache application should handle the object itself. Otherwise, if the consistency slave knows the consistency type of the object, it executes the specific consistency protocol. If the consistency type is not known yet (e.g., when object is not in local cache), the slave interacts with the consistency coordinator to retrieve the object's characteristics and, optionally, the associated content. Eventually, the slave returns to the cache application with an indication of whether a local copy is valid or the cache should retrieve the object from an indicated location.

Read-for-Update Command

This command is invoked by the cache application when it has to initiate an update operation. The call parameters provide the object identifier, and metadata information such as the existence of the object in the cache. If the object is registered with the consistency slave and the metadata indicates a consistency type that does not need any consistency-related procedure, the call returns with the indication that the cache application should handle the object itself. Otherwise, if the consistency slave knows the consistency type of the object, it executes the specific consistency protocol. For instance, if the policy is Update-Global Copy, the slave interacts with the coordinator to acquire the lock on the object. If the consistency type is not known yet (e.g., when object is not in local cache), the slave interacts with the consistency coordinator to retrieve the object's characteristics and, optionally, the associated content. Eventually, the slave returns to the cache application with an indication of whether a local copy is valid or the cache should retrieve the object from an indicated location, and on whether the cache should create the new version of the object without overriding the current version.

Update-Completion Command

This command is invoked by the cache application when it completes an update operation. The call parameters provide the object identifier, indication of whether the update completes successfully or it was aborted, and the location of the new version (if successful update). Depending on the consistency type of the object, the consistency slave interacts with the coordinator to indicate the completion of the operation.

Discard Command

This command is invoked by the cache application when it discards an object from the local store. The consistency slave executes the protocol specific for the object type. No specific information is returned to the cache application.

The consistency slave learns about the type of consistency associated with an object from the metadata attached to the replies to its GET and LOCK requests to the consistency coordinator.

Object invalidations and acknowledgements, (deferred) removal notifications, and heartbeat messages may be delivered through messages on a persistent connection between the cache node and consistency coordinator node.

The interaction between the slave and the coordinator can be embedded in HTTP messages or they can be implemented by other protocols. In the former case, GET, IF MODIFIED SINCE, and LOCK requests can be sent with HTTP GET requests. UPDATE, CONSISTENCY-POLICY-CHANGE, and RECOVER requests can be sent with HTTP POST requests. Similarly, INVALIDATION and HEARTBEAT messages can be sent with HTTP POST requests. The messages initiated by the coordinator, such as HEARTBEAT and INVALIDATION messages, are received at a designated port of the cache node, which can be handled by the consistency slave module itself or by cache application. In the former case, the consistency slave interface includes a callback function, which is invoked by the cache application upon arrival of a message on the designed port.

Batch Removal Notifications

For the update-holders and coordinate-holders policies, the slaves send notifications of cache removal when objects are discarded from their caches. To reduce the overhead, these notifications can be batched in messages of up to MAX-MSG-SIZE bytes. These messages are sent when the maximum size is reached or a predefined time interval has elapsed since the first notification in the message was generated.

Due to batching or network delays, the coordinator can receive removal and get requests in reverse logical order, e.g., the GET following a removal GET arrive at the coordinator a priori to the removal notification. To ensure a correct accounting, the coordinator keeps track of the number of requests and removals received for a particular (object, cache)-pair for objects subject to update-holders or coordinate-holders policy. On each request, the counter is incremented, and on each removal the counter is decremented. The server removes the cache from the holders list for the object when the counter gets to zero.

Aggregation of Consistency Protocol Messages

To reduce the overhead related to the transmission of consistency protocol messages, consistency coordinators and/or or consistency slaves can aggregate several messages in one packet. For instance, Invalidation messages sent by the consistency coordinator can include the ID's of several objects. Similarly, the Acknowledgment message sent by a cache can include the ID's of several objects.

For further overhead reductions, the consistency infrastructure enables the specification of consistency groups. Toward this end, an object is identified by the content provider by its ID and the list of consistency groups it belongs to. Update requests for a consistency group should trigger the invalidation of all of the objects in the group.

In this way, it is not necessary to enumerate each object in the group explicitly. Data update propagation (see e.g., "A Scalable System for Consistently Caching Dynamic Web Data", Jim Challenger, Arun Iyengar, and Paul Dantzig. In *Proceedings of IEEE INFOCOM'99*, New York, N.Y., March 1999) may be used to specify group membership.

Prefetch/Push for Deferred Consistency Protocol

Servers and/or content providers may have the ability to prefetch or push a new version of an object to a cache.

Selecting Consistency Methods

A system of the present invention can select different cache consistency policies for different situations. There is often a trade-off between degrees of consistency and overhead. Stronger consistency results in higher overhead. There are a number of methods the system uses to adapt proper consistency policies to an application. These may include that the application can specify the consistency policy for a particular object, and/or that the system can monitor performance and update characteristics of the system in order to choose an appropriate consistency policy.

For objects, which are updated frequently, a weaker form of consistency is generally preferable. The choice of whether to use update-all versus update-holders for weak consistency, or coordinate-all versus coordinate-holders consistency, may depend on the nature of the requests. For objects, which are usually included in all caches at the time an update request is received, it may be preferable to use update-all for weak consistency and coordinate-all for strong consistency. This is because all caches may need to be contacted in the event of an update, so the overhead of update-holders and coordinate-holders may be too high.

However, for objects updated reasonably frequently, which may be stored in only a fraction of the caches at the time of an update, update-holders and coordinate-holders may be preferable. The consistency level may also be varied depending on the performance of the system. When performance is poor due to the overhead of the consistency policy, a weaker consistency policy may be used. For example, strong consistency for some objects could be replaced by weaker consistency methods such as update-all, update-holders, deferred invalidation consistency, and/or expiration times.

When the overhead for maintaining consistency is minimal, the system may manage more objects using stronger consistency methods. For example, some objects managed using weak consistency could become managed using strong consistency.

State Dependent Consistency Management

Another embodiment will now illustrate other aspects of the present invention. There are some applications where the consistency requirements of the objects change over the objects' lifetime. During some (and often small) periods in an object's lifetime the object needs strong consistency and for a majority of the time a weak consistency model would suffice for the object.

Examples for applications where objects demonstrate varying consistency needs may include online airline reservation systems, online auction systems, etc. In online airline reservations systems, users check the availability of tickets for flights and may book tickets on particular aircrafts if seats are available. In these systems, the seats available in each aircraft for any particular day are the objects. These objects may need strong consistency when the available seats in the aircraft fall below some threshold (e.g., an object needs strong consistency when the seats in the airline are nearly sold out). If the objects were not maintained at strong consistency levels, the system may oversell the tickets or deny a request even when seats are available, both of which are undesirable. When a particular aircraft has large number seats available, then it does not need such stringent consistency guarantees. A weaker form of consistency would suffice for such objects.

In an online bid auction system, each object corresponds to an article that is being auctioned on the system. In these applications there are several thousands of articles that are being auctioned. In this application an object may need strong consistency only when a deadline for its auction is very near. For example, it may be reasonable to assume that an object needs to be maintained at strong consistency levels when its bid is about to expire within, say, 2 hours. At other times, it would suffice to maintain the object at weaker consistency levels with some guarantees (such as a bound on the staleness or a bound on the error an access would see on the maximum bid price).

The above two examples illustrate two important characteristics of such applications. The consistency needs of the objects in the system vary over their lifetime, and the consistency needs of the objects are dependent on the state of those objects. The state of the object may be either "semantic" or "temporal" or some combination of both. For example, in the airline example given above, the consistency needs are dependent on the semantic state of the objects, whereas in the online auction system, the need that the objects be maintained at strong consistency levels within 2 hours of its bid expiry time is an example of the consistency needs depending on the temporal state of the object.

Object State Dependent Consistency Management

The present invention includes methods to counter the shortcomings of the prior art to permit consistency needs to vary over the lifetime of the objects. This may be achieved by allowing the application to specify the consistency needs of the objects based on the state of those objects. The state may be semantic (specified in terms of the parameters of the object) or temporal or a combination of both.

When an operation needs to be performed on the object either at the caches or at the consistency coordinator (such as performing a read or write on the object), the consistency requirements (specified by the application) are verified. The system tries to accord the level of consistency as specified by the application.

The system also permits the applications to choose from a wider variety of consistency specifications rather than just "Strong" and "Weak" consistency. The consistency specifications that can be chosen by the application are explained below.

Specifying Consistency Needs

Several consistency policies may be selected in accordance with the present invention, including but not limited to the following:

1. Always Strong Consistency: The object is provided strong consistency throughout its lifetime. Therefore whenever the object has to be written the particular cache obtains a write-lock and then proceeds with the writing.
2. Conditional Strong Consistency: The object is provided strong consistency if some conditions are met. Otherwise a weak consistency policy is adopted. The conditions may be specified based on the state of the object. Examples of this kind of consistency policy may include, for example:
    1. Strong Consistency if the number of available tickets falls below 10% of the total seats on the aircraft, for an airline reservation system.
    2. Strong Consistency if the bid expiry time of the object is less than 2 hours away from the current time, for an online auction system.
3. Weak Consistency with Guarantees: The object can tolerate some relaxation in its consistency policy. The object does not need strong consistency, but it needs some kinds of guarantees with weak consistency. The guarantees may be specified either on the semantic or the temporal state of the object. Examples of this kind of consistency policy may include, for example:
  a. Object should be made globally consistent immediately if the number of available seats change by more than 5%
  b. Object should be made globally consistent within 5 minutes of any write operation.
4. Weak Consistency: The object tolerates relaxation in its consistency policy and does not need any guarantees.

The above conditions are expressed as meta-data for each object. It is expected that these conditions would be expressed in terms of the component-variables of the object and its lifetime. The edge servers and a consistency coordinator may evaluate these conditions and take actions accordingly. An illustrative system implementing a State Dependent Consistency Management (SDCM) will now be described.

The SDCM system architecture may be in the form depicted in FIG. 1. With reference to FIG. 1 The system 10 has a plurality of caches 13 that store, serve and modify the objects in the system. The consistency coordinator 12 coordinates the reads and writes on each object in accordance with the consistency guarantees it needs. The caches 13 communicate with the consistency coordinator and may depending on the implementation not communicate among themselves.

The present embodiment prioritizes the communication between caches 13 and the consistency coordinator 12 to improve the performance of the system from a user perspective. The system 10, while prioritizing the communication, strives to honor the consistency guarantees needed by each cache 13. The scheme provides higher priority to those operations that directly affect the user-perceived latency of the system. Thus those operations that do not directly affect the user-perceived latency are provided best-effort communication such that none of the consistency guarantees are violated.

Figure 3:
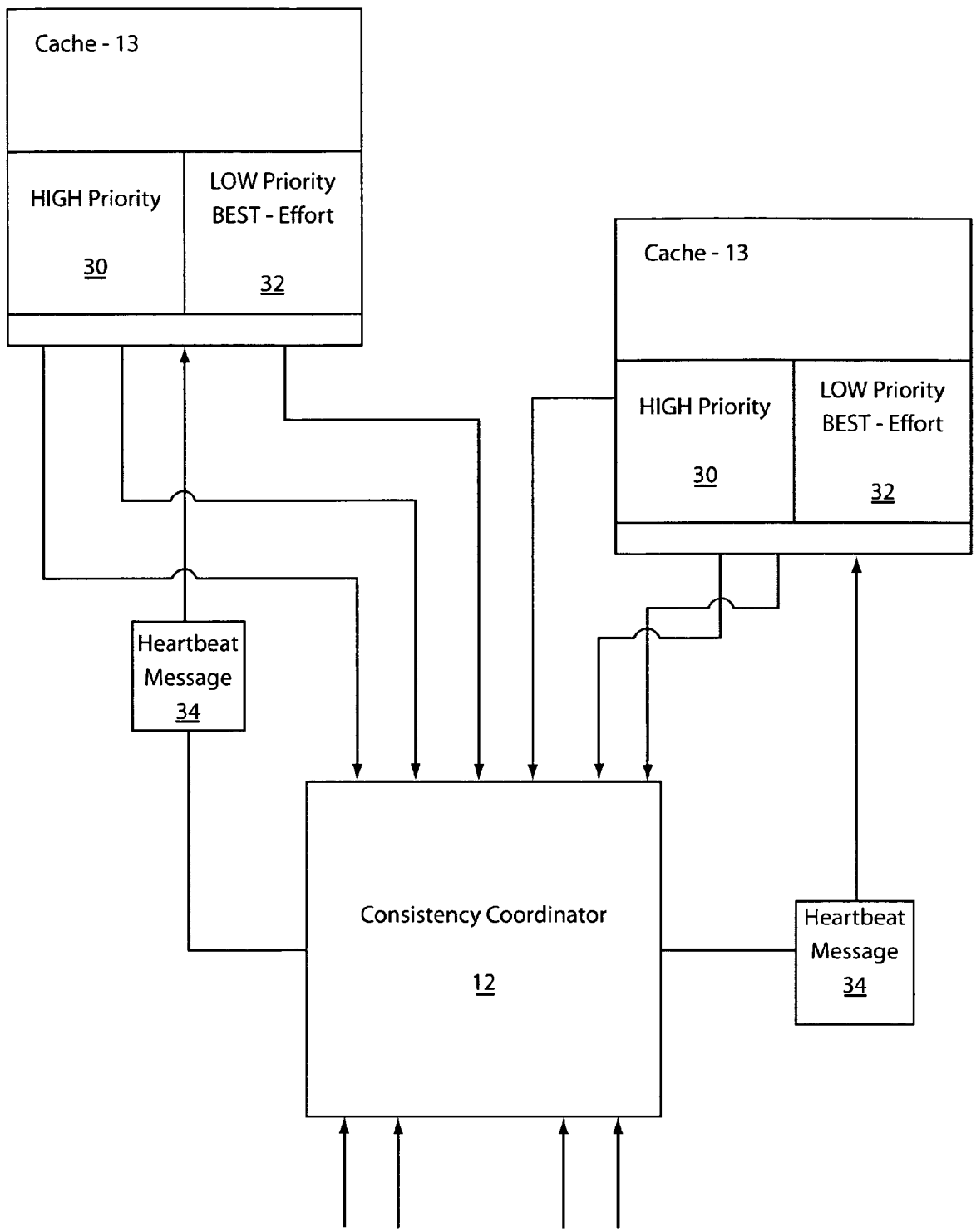
FIG. 3 is a block diagram showing a system, which employs different level queues in caches for maintaining consistency in accordance with the present invention.

Referring to FIG. 3, the system 10 is shown in greater detail. Each cache 13 maintains two communication queues: a High-Priority Queue 30 and a Best-Effort communication queue or Low-Priority Queue 32. These queues include the messages that need to be communicated to the consistency coordinator 12. As the names of the two queues suggest, the messages in the High-priority queue 30 are given priority over those in the Low-Priority (Best-Effort) queue 32. Messages are put into these queues based on a multitude of factors such as the operation's impact on the user-perceived latency and whether the operation resulted in any object getting close to violating its consistency rules, etc. For example, a GET request or a GET-LOCK request would go to the High-Priority Queue 30, as these operations directly impact the latency as experienced by the user. Whereas the message corresponding to an operation that changed an object that needs weak consistency, without violating any consistency guarantees is put in the low-priority queue 32.

When the application running in conjunction with the caches 13 generates a consistency message to be communicated to the consistency coordinator 12, the application evaluates the rules specified by the corresponding object creator to determine whether the message should be sent to the High-Priority queue 30 or the Best-Effort queue 32. If the object is in the strong consistency mode (either the object is specified as "Always Strong Consistency" or it is specified as "Conditional Strong Consistency" and the conditions are satisfied), or the object is in the weak consistency mode and the write to the object may cause some of the guarantees to be violated, then the application indicates that the particular message be put into the High-Priority Queue 30. The cache 13 maintains one or more connections to the consistency coordinator 12 depending on the load of the consistency coordinator as explained hereinbelow.

The messages in the two queues are channeled through these connections to the consistency coordinator 12. When a connection becomes available, the cache 13 determines which message should be sent to the consistency coordinator 12. The messages in the High-Priority queue 30 are given preference, if none of the guarantees given to the weak consistency mode are violated. If there are no messages in the High-Priority queue 30 then the messages in the Low-Priority queue 32 are communicated to the consistency coordinator 12. A message in the Low-Priority queue 32 may need immediate communication, in case some of the guarantees are on the verge of being violated. For example, a message may correspond to an object that requires that it must be made globally consistent within 5 minutes of change. The message would be put in the Low-Priority queue 32, when it arrives at the cache 13. If it is not communicated to the consistency coordinator 12 for 4.8 minutes (due to the load in the cache), the message enters a phase where it needs immediate communication to avoid any violations of the guarantees provided to the object. In cases like these, the message is elevated to High-Priority status and provided immediate communication.

Each cache 13 maintains one or more connections to the consistency coordinator 12. The number of connections depends upon the current message load at the consistency coordinator 12. If the consistency coordinator 12 is experiencing a heavy message load, then the caches 13 decrease the number of open connections to the consistency coordinator 12. If the consistency coordinator 12 is lightly loaded, then caches 13 open new connections (if they need additional connections). The load on the consistency coordinator 12 is periodically communicated to the caches 13 through a Heart-Beat message 34. The load on the consistency coordinator can be measured in various ways. For example, a number of outstanding open connections may be employed as a measure of the load on the consistency coordinator 12.

The consistency coordinator 12 maintains information about each object and coordinates the consistency related activities for objects in the system. The consistency coordinator maintains a connection to each cache 13, which is used for consistency related communication from the consistency coordinator 12 to the caches 13.

In the SDCM system, the application running in conjunction with the caches (consistency slaves) can write to objects in the weak-consistency mode without locking the object. This brings up a possibility of multiple concurrent writes occurring on the same object at different caches, which may sometimes result in rollbacks of some write operations. The present invention entrusts the consistency coordinator 12 with the responsibility of resolving the conflicting writes on an object.

A cache that has written a weakly consistent object conveys the write to the consistency coordinator 12 through an UPDATE request. The UPDATE request includes the new version (after the write) of the object. The UPDATE request is eventually conveyed to the consistency coordinator 12. On receiving an UPDATE, the consistency coordinator 12 may initiate the following set of operations:

1) The Consistency-Coordinator sends out a message to caches to invalidate the particular object (INVALIDATION message).
2) Each cache on receiving an INVALIDATION Message, checks if there exists a copy in its repository which has changed locally but has not been communicated to the Consistency-Coordinator (hereafter called a Dirty-Copy). If a Dirty-Copy exists, the cache acknowledges the INVALIDATION message by sending the Dirty-Copy to the consistency coordinator 12. If no Dirty-Copies exist, then it notifies the consistency coordinator that it does not have a dirty copy. In either case, the copy in the cache (if it has one) is invalidated.

3) the consistency coordinator 12 on getting acknowledgments from all caches, checks if there is more than one dirty copy of the object. If so these copies have to be merged to obtain a globally consistent version of the object. This may be done by:
   a) If some part of the distributed application is running in conjunction with the consistency coordinator 12, then the business specific logic can be used to merge the objects and obtain a globally consistent object. For example, in an airline reservation system, the business logic would dictate that if two caches sold one ticket each, then the globally consistent value would be 2 less than the previous version of the object.
   b) If there is no business specific logic available, the Consistency-Coordinator can fall back on some default mechanism like accepting the copy that was written the earliest and rejecting all others.

4) Once all the dirty copies are merged and a globally consistent object is obtained, the consistency coordinator determines if any rollback messages need to be sent to any caches and sends out rollback messages accordingly.

Heartbeat messages 34 verify whether the caches 13 are alive. In addition, the heartbeat messages 34 are used to periodically communicate the current load on the consistency coordinator 12 to the caches 13. The number of open connections a cache maintains with the consistency coordinator 12 may be used to determine this parameter. The load on the consistency coordinator 12 can be measured through various mechanisms, for example, the CPU load, the load on the main memory, network bandwidth usage, turn-around latency, etc. A more generic approach may include measuring the system load by the number of outstanding connections at the consistency coordinator 12. This is compared against a reference value for the same parameter to determine the extent of overload on the system. This parameter is communicated to the caches 13, which open or close connections accordingly.

Figure 4:
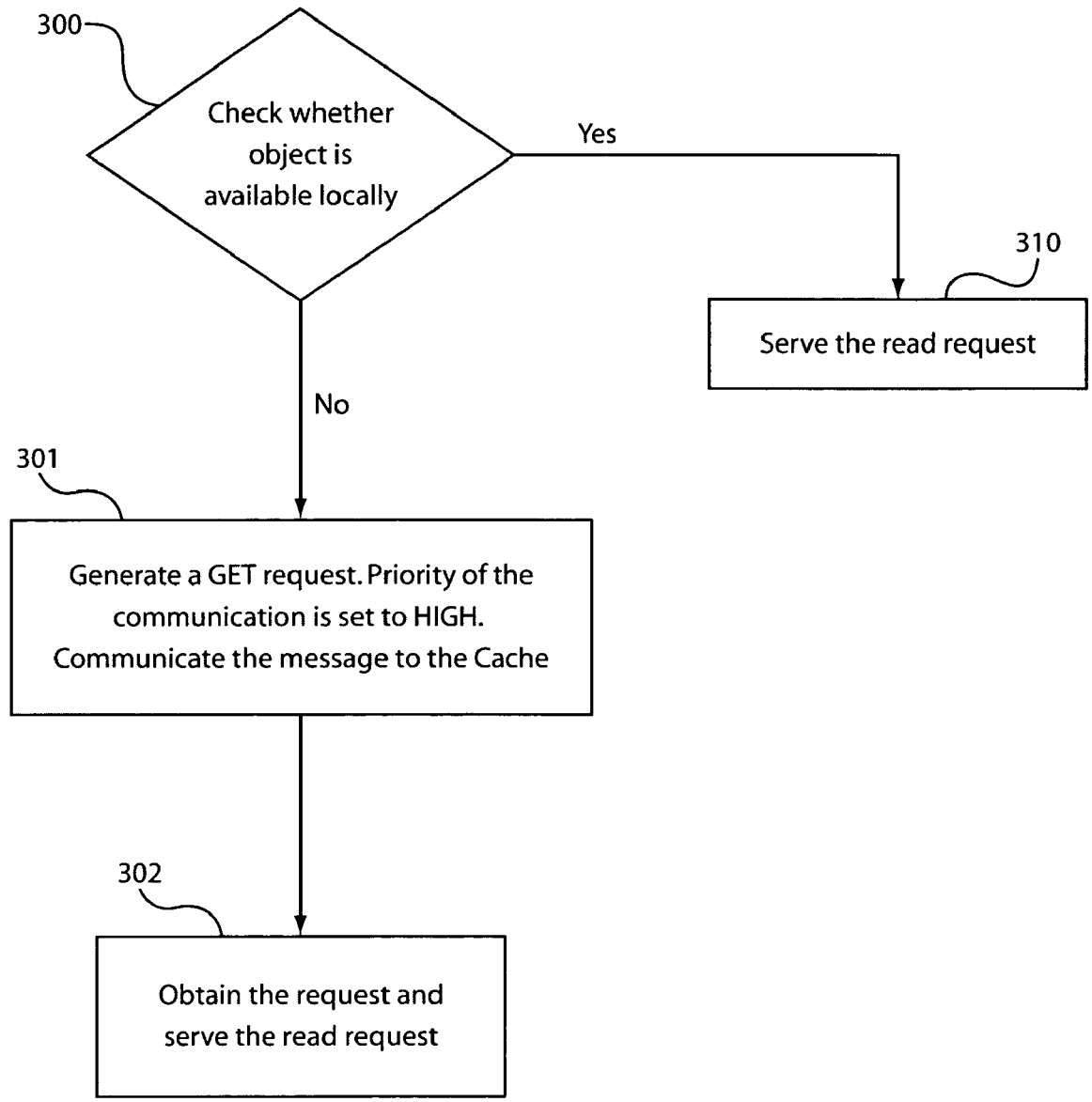
FIG. 4 is a block diagram showing operations of an application on an object read in accordance with the present invention.

Referring to FIG. 4, the operation of an application running at a cache upon receiving a read request for an object is illustratively shown. As indicated in step 300, the application checks whether the object is locally available. If the object is locally available, step 310 is executed wherein the read request is served. If the object is not locally available the application executes the step 301. In step 301, the application generates a GET request for the particular object. As GET requests impact the user perceived latency, the priority is set to HIGH. The message is communicated to the cache, which is responsible for fetching the object. In step 302, the application obtains the object from the cache and serves the read request.

Figure 5:
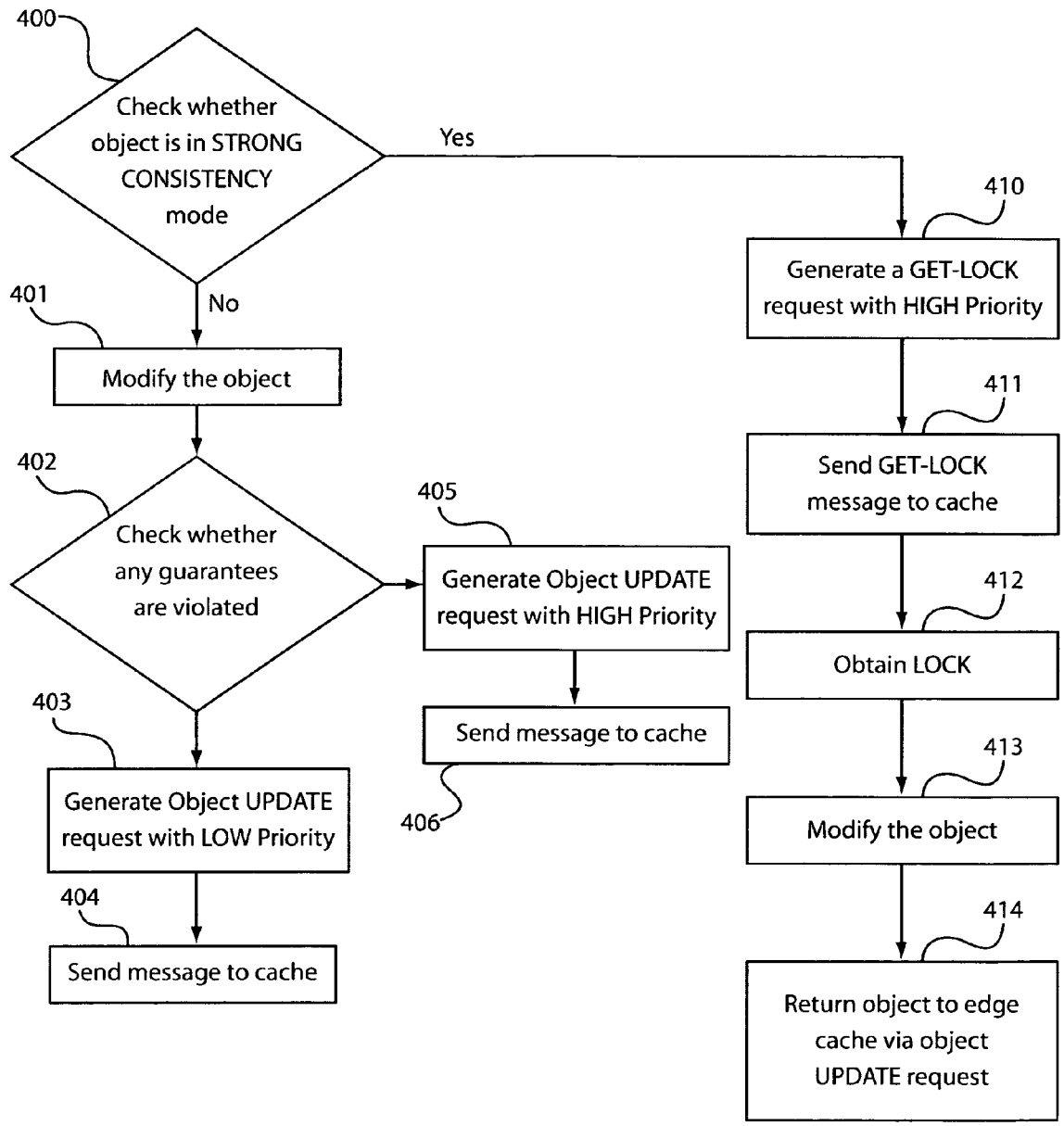
FIG. 5 is a block diagram showing operations of an application on an object write in accordance with the present invention.

Referring to FIG. 5, illustrates the operation of an application running at the cache on receiving a request to modify an object (object write request). In step 400, the application evaluates conditions specified on the object to determine whether the object is in strong or weak consistency mode. If the object is in strong consistency mode, the application executes step 410, otherwise the application executes step 401. In step 410, the application generates a GET-LOCK request. The priority level is set to HIGH as the operation affects the user perceived latency. In step 411, the application communicates this request to the cache. The cache communicates with the consistency coordinator to obtain a lock to the object. In step 412, the application obtains the lock. In step 413, the application writes to the object and returns the object to the cache by generating an UPDATE request and communicating the same to the cache in step 414.

If the object is not in strong consistency mode, the application executes step 401, where the object is modified without obtaining a write lock. In step 402, the application checks whether any semantic or temporal guarantees are needed by the object and are about to be violated. If so, then the application executes 405 where an UPDATE request is generated with HIGH priority. Otherwise, the application generates an UPDATE request with low priority as shown in step 403. In either case the UPDATE message is communicated to the cache as indicated in steps 404 and 406.

Figure 6:
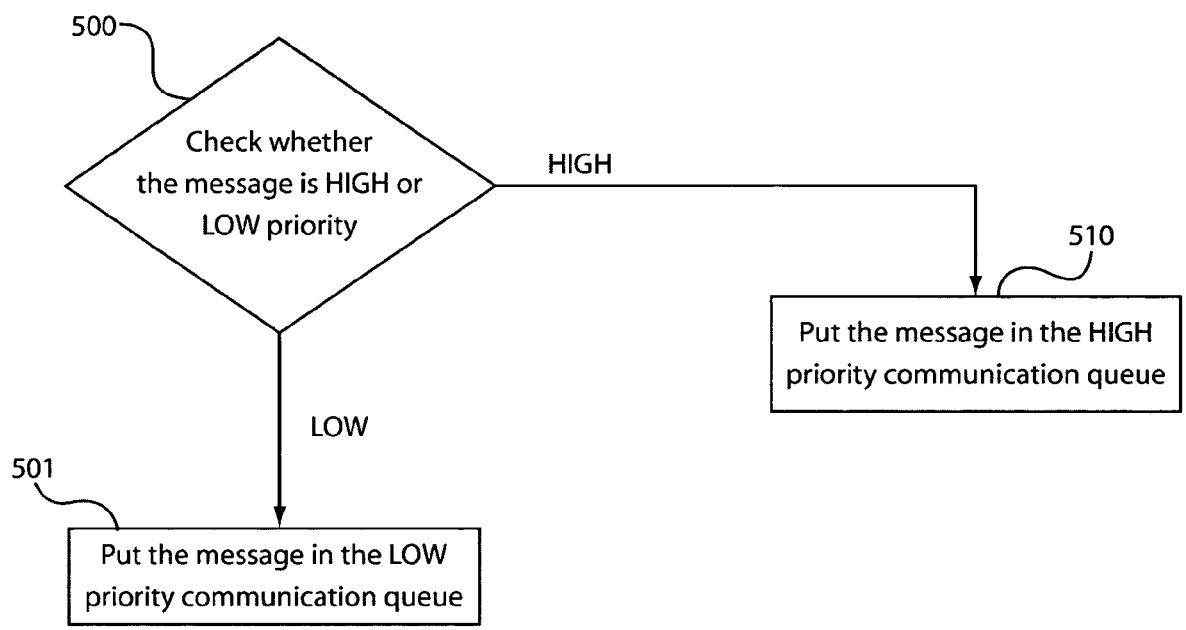
FIG. 6 is a block diagram showing operation of a cache receiving a communication message from an application in accordance with the present invention.

Referring to FIG. 6, the operation of a cache on receiving a request message from the application is illustratively shown. The cache verifies whether the request is high or low priority as shown in step 500. If the request is low priority, the message is put into the low priority communication queue as in step 501. If the message is high priority the message is put into the high priority communication queue as indicated in step 510.

Figure 7:
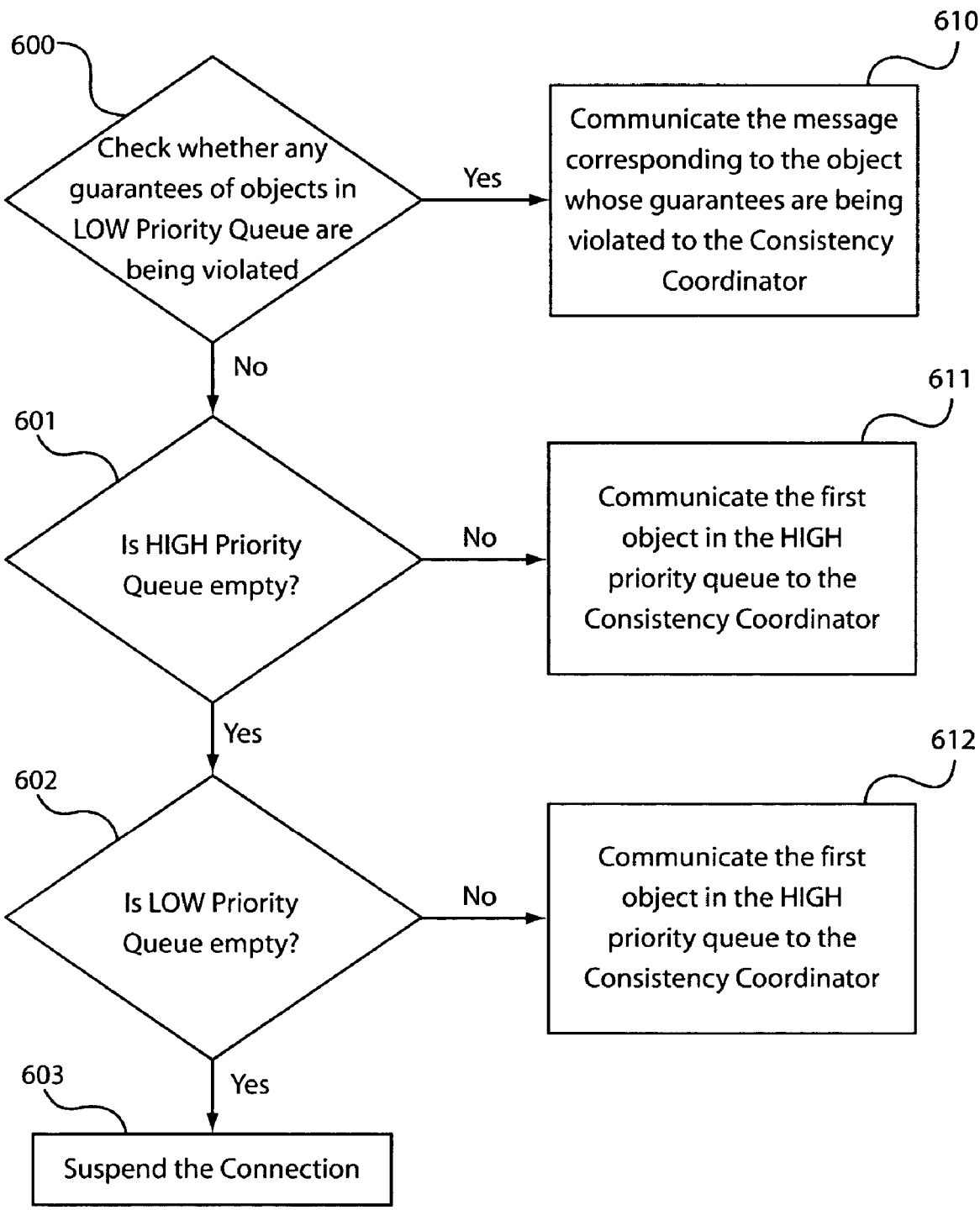
FIG. 7 is a block diagram showing operation of a cache when a consistency coordinator becomes available in accordance with the present invention.

Referring to FIG. 7, the operations performed by a cache when an ongoing communication with the consistency coordinator completes and a connection becomes available for initiating new communication with the consistency coordinator are illustratively shown. In step 600, the cache verifies whether any guarantees provided to any object in the low priority queue are about to be violated. This step 600 focuses on checking temporal guarantee violations. If so, the cache communicates the message corresponding to that object whose guarantees are violated to the consistency coordinator, as indicated in step 610. Otherwise, the cache checks whether the high priority queue is empty in step 601. If the high priority queue includes one or more messages, then the cache executes step 611, where the first message in the high priority queue is communicated to the consistency coordinator.

If the high priority queue is empty, the cache executes step 602 to verify whether the low priority queue is empty. If the low priority queue includes at least one message, then the first message from the low priority queue is communicated to the consistency coordinator in step 612. Otherwise, there are no messages to be communicated to the consistency coordinator and hence the connection is suspended in step 603.

Figure 8:
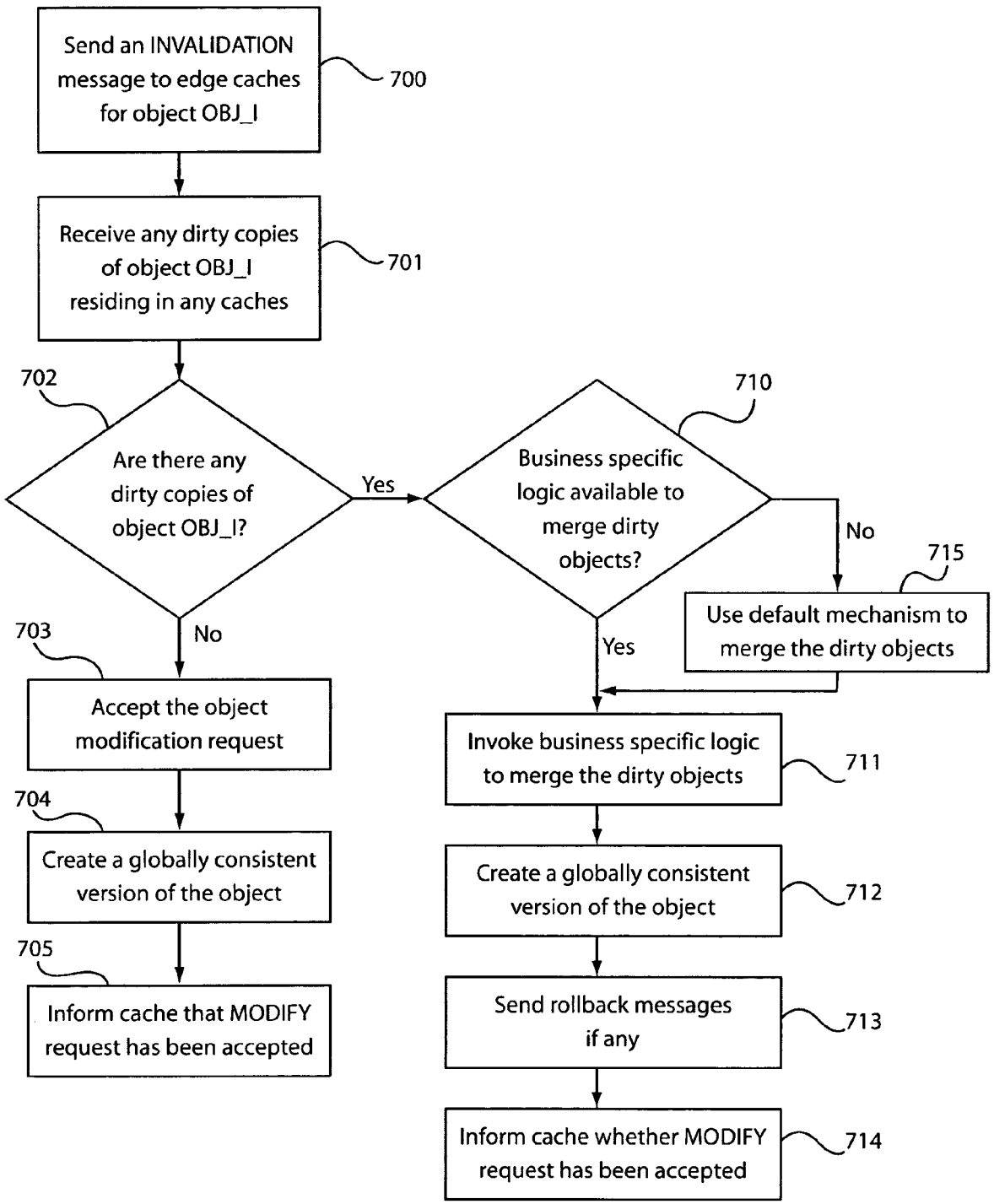
FIG. 8 is a block diagram showing operation of a consistency coordinator upon receiving an object modify message from a cache in accordance with the present invention.

Referring to FIG. 8, the operation of the consistency coordinator on receiving an object UPDATE message from one of the caches is illustratively depicted. In step 700, the consistency coordinator sends an INVALIDATION message for the object to caches. A cache on receiving an INVALIDATION message checks whether there are any copies of the same object that have been written in the cache but not yet communicated to the consistency coordinator. These copies are called "dirty copies". If there are any dirty copies, the caches respond to the invalidation message with these dirty copies. Otherwise, the caches respond back that they do not have any dirty copies. The consistency coordinator receives dirty copies from different caches in step 701. Then, the consistency coordinator checks whether the number of dirty copies is at least one in step 702. If so, the consistency coordinator executes step 710, otherwise, the consistency coordinator proceeds to step 703.

In step 703, the consistency coordinator accepts the object UPDATE request. In step 704, the consistency coordinator creates a globally consistent version of the object. The consistency coordinator then informs the cache that the object UPDATE request has been accepted. If the number of dirty objects is at least one, then these dirty objects have to be merged to obtain a globally consistent version of the object.

The consistency coordinator checks whether business specific logic is available to merge the dirty copies as indicated in step 710. If so, the consistency coordinator invokes the business specific logic to merge the object versions in step 711. Otherwise, the consistency coordinator uses a default mechanism to merge the dirty copies of the object. In either case the consistency coordinator creates a globally consistent version of the object in step 712. Then, the consistency coordinator sends any rollback messages if needed to any cache that had sent dirty copies in step 713. The consistency coordinator informs the cache whether the object UPDATE had been successful in step 714.

Figure 9:
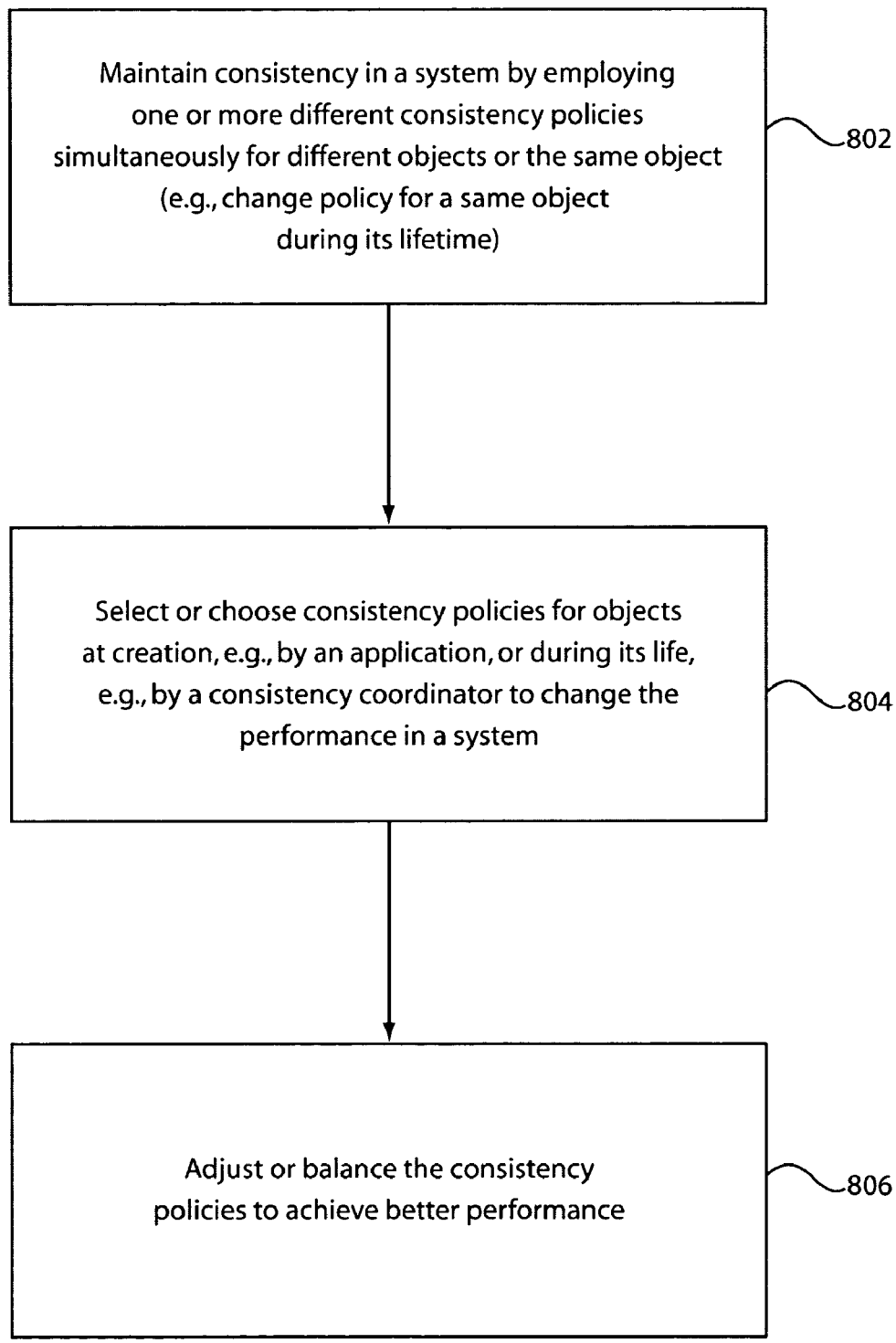
FIG. 9 is a block diagram showing operation of a system to maintain consistency be selectively employing different consistency policies in accordance with the present invention.

Referring to FIG. 9, in a system comprised of a plurality of objects where multiple copies of an object may exist, a method for maintaining consistent copies is provided in accordance with the present invention. In block 802, consistency is maintained in the system by using a plurality of consistency policies. The different consistency policies may include different methods of consistency or different levels of consistency. For example, one consistency policy may include an update-all consistency and a second consistency policy may include an update-holders consistency policy. In another embodiment, one consistency policy may include coordinate-all consistency and a second consistency policy may include coordinate-holders consistency. In still other embodiments, the plurality of consistency policies may include both strong and weak consistency policies. These consistency policies are employed simultaneously or are changed for a single object multiple times over its lifetime. For example, the plurality of consistency policies may include a strong consistency under at least one condition but a weak consistency policy if the at least one condition is not met.

In block 804, the consistency policies may be selected or chosen. This may be performed at the creation of the object by an application or at a later time by, for example, the consistency coordinator. Motivation for switching policies may be to gain better or different performance for one consistency policy than for a second consistency policy. The selection is performed from the plurality consistency policies, and the policy may be different for each object. Different consistency policies are preferably available simultaneously to improve system performance.

In block 806, a consistency policy may be chosen for an object, which balances between consistency level and performance. In this way, the overhead associated with strong consistency can be relaxed to achieve better system performance. This includes adjusting a level of consistency for at least one object in response to consistency overhead. These policies can be dynamically shifted over time. For example, an object managed using one of expiration time, update all, update holders, and deferred invalidation consistency becomes managed using strong consistency, or an object managed using strong consistency becomes managed using one of update all, update holders, and deferred invalidation consistency.

Having described preferred embodiments of a system and method for achieving different levels of data consistency (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. In a system comprised of a plurality of objects stored in a plurality of caches, a method for maintaining consistent copies of the objects, comprising the steps of:
   providing a plurality of consistency policies including at least a first and second consistency policy, wherein each consistency policy specifies how to reconcile multiple versions of an object;
   selectively applying the first consistency policy to achieve a degree of consistency above a consistency level at a first overhead;
   selectively applying the second consistency policy to achieve a degree of consistency below the consistency level at a second overhead which is less than the first overhead, to thereby achieve greater system performance by reducing overhead for maintaining consistency;
   differentiating or prioritizing communication between a cache and a consistency coordinator by a cache device; and
   maintaining at least two queues in the cache to hold messages communicated to the consistency coordinator.

2. The method as recited in claim 1, wherein the plurality of consistency policies comprise an update-all consistency policy, an update-holders consistency policy, a coordinate-all consistency policy, or a coordinate-holders consistency policy.

3. The method as recited in claim 1, further comprising including in the plurality of consistency policies strong and weak consistency policies.

4. The method as recited in claim 1, further comprising including in the plurality of consistency policies a strong consistency policy under at least one condition but a weak consistency policy if the at least one condition is not met.

5. The method as recited in claim 1, further comprising a step of managing the plurality of consistency policies using the consistency coordinator.

6. The method as recited in claim 1, further comprising selecting a consistency policy for an object by an application that updates the object.

7. The method as recited in claim 1, wherein an object has a lifetime and the method further comprises a step of switching a consistency policy of the object during the object's lifetime.

8. The method as recited in claim 1, further comprising steps of:
   measuring activity of the consistency coordinator, which manages the consistency policies in the system; and
   maintaining connections with caches in the system in accordance with the activity of the consistency coordinator.

9. The method as recited in claim 8, further comprising communicating the activity of the consistency coordinator to the caches.

10. The method as recited in claim 9, wherein the step of communicating the activity comprises sending heartbeat messages to the caches.

11. The method as recited in claim 1, further comprising choosing a consistency policy for at least one object which maximizes system performance.

12. The method as recited in claim 11, wherein system performance is maximized by adjusting at least one of CPU overhead, communication latency and message overhead.

13. The method as recited in claim 1, wherein a consistency policy of at least one object is specified as a condition in terms of a temporal or semantic state of the at least one object.

14. The method as recited in claim 1, wherein the consistency policy is selected from at least one of always strong consistency, conditional strong consistency, weak consistency with guarantees, and weak consistency.

15. The method as recited in claim 1, further comprising the step of prioritizing messages in one queue with a higher priority than messages in another queue.

16. The method as recited in claim 1, further comprising the step of maintaining a number of connections by a cache which is dynamically varied depending upon a load on the consistency coordinator.

17. The method as recited in claim 1, further comprising adjusting a level of consistency for at least one object in response to consistency overhead.

18. The method as recited in claim 1, wherein an object that is managed using expiration time, update all, update holders, or deferred invalidation consistency becomes managed using strong consistency.

19. The method as recited in claim 1, wherein an object that is managed using strong consistency becomes managed using one of update all, update holders, and deferred invalidation consistency.

20. A program memory storage device readable by machine, tangibly embodying a program of instructions executable by the machine to perform method steps for a method for maintaining consistent copies of an object, the method steps comprising:
    providing a plurality of consistency policies including at least a first and second consistency policy, wherein each consistency policy specifies how to reconcile multiple versions of an object;
    selectively applying the first consistency policy to achieve a degree of consistency above a consistency level at a first overhead;
    selectively applying the second consistency policy to achieve a degree of consistency below the consistency level at a second overhead which is less than the first overhead, to thereby achieve greater system performance by reducing overhead for maintaining consistency;
    differentiating or prioritizing communication between a cache and a consistency coordinator by a cache device; and
    maintaining at least two queues in the cache to hold message communicated to the consistency coordinator.

21. A system for maintaining consistent copies of objects, comprising:
    a plurality of caches for storing objects;
    a plurality of consistency policies maintained throughout the system, the consistency policies including at least a first and second consistency policy, wherein each consistency policy specifies how to reconcile multiple versions of an object stored in one or more of the plurality of caches; and
    a consistency coordinator having selective communication with the caches, which selectively applies the first consistency policy to achieve a degree of consistency above a consistency level at a first overhead and which selectively applies the second consistency policy to achieve a degree of consistency below the consistency level at a second overhead which is less than the first overhead, to thereby achieve greater system performance by reducing overhead for maintaining consistency,
    wherein each cache comprises at least two queues which designate an update priority of an object included in each queue; wherein the consistency coordinator manages requests for updates from the caches in accordance with the update priority of a cached object and a consistency policy currently applied for the cached object.

22. The system as recited in claim 21, wherein the plurality of consistency policies comprise an update-all consistency policy, an update-holders consistency policy, a coordinate-all consistency policy, or a coordinate-holders consistency policy.

23. The system as recited in claim 21, wherein the plurality of consistency policies includes strong and weak consistency policies.

24. The system as recited in claim 21, wherein the plurality of consistency policies includes a strong consistency policy for an object under at least one condition but a weak consistency policy for the object if the at least one condition is not met.

25. The system as recited in claim 21, further comprising an application that updates an object and which select a consistency policy for an object.

26. The system as recited in claim 21, further comprising a number of connections between the consistency coordinator and the caches wherein the number is adjusted in accordance with activity of the consistency coordinator.

27. The system as recited in claim 26, wherein the activity of the consistency coordinator is communicated to the caches.

28. The system as recited in claim 26, wherein the activity is communicated with heartbeat messages to the caches.

29. In a system comprised of a plurality of objects stored in a plurality of caches, a method for maintaining consistent copies of the objects, comprising the steps of:
    providing a first consistency policy, where a consistency policy specifies how to reconcile multiple versions of an object, wherein the first consistency policy updates an object for which multiple copies exist by sending out at least one message to invalidate a copy of the object and waiting for an acknowledgement that the invalidation message has been received before assigning a new value to the object;
    providing a second consistency policy which updates an object without waiting for an acknowledgement that a message to invalidate a copy of the object has been received;
    selectively applying the first consistency policy to achieve a degree of consistency above a consistency level at a first overhead;
    selectively applying the second consistency policy to achieve a degree of consistency below the consistency level at a second overhead which is less than the first overhead, to thereby achieve greater system performance by reducing overhead for maintaining consistency;
    differentiating or prioritizing communication between a cache and a consistency coordinator by a cache device; and
    maintaining at least two queues in the cache to hold messages communicated to the consistency coordinator.

* * * * *